Dec. 29, 1936.  J. A. DORST  2,065,516
VEHICLE
Filed Jan. 11, 1936
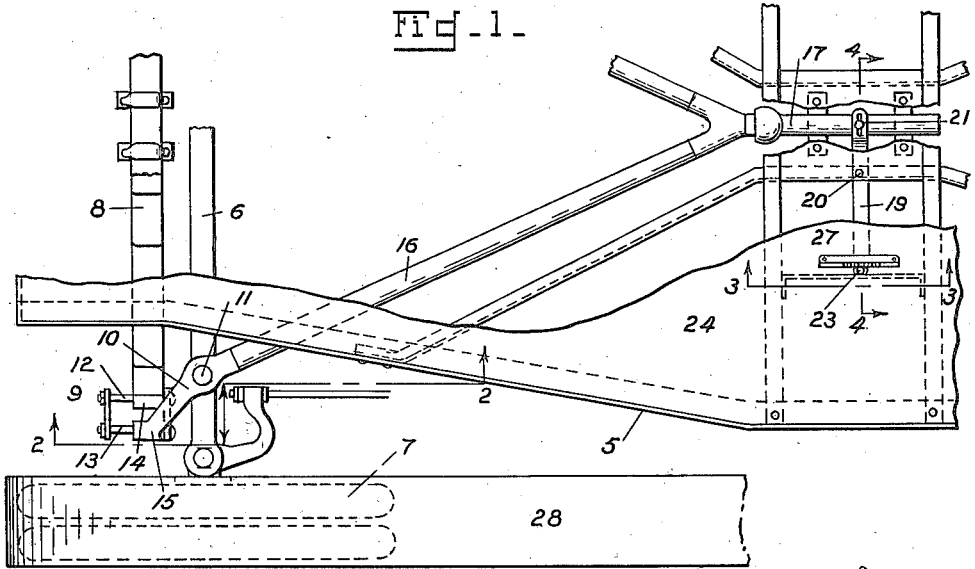
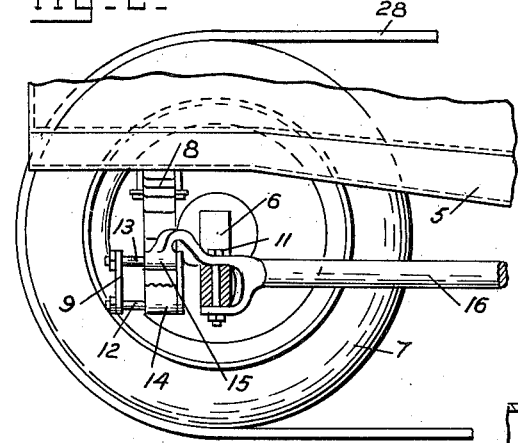
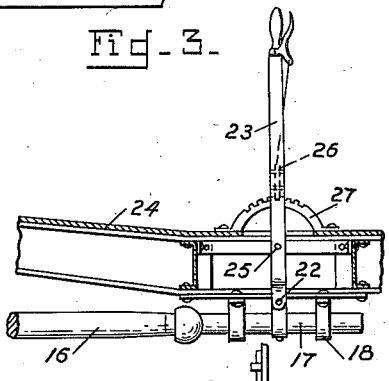
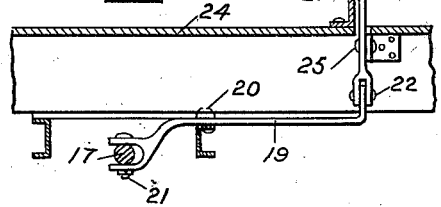
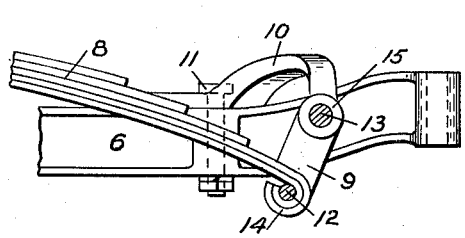
Inventor
James A. Dorst
By W. N. Roach
Attorney Patented Dec. 29, 1936

2,065,516

UNITED STATES PATENT OFFICE 2,065,516

VEHICLE

James A. Dorst, United States Army,
San Francisco, Calif.

Application January 11, 1936, Serial No. 58,709

5 Claims. (Cl. 305—3)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to a vehicle which may utilize wheel or belt traction and to a method of constructing such a vehicle from the chassis of a standard automobile.

Wheeled vehicles and track-laying vehicles have distinctive types of suspensions particularly adapted to the mode of traction and the nature of the surface over which the vehicle is to travel. In constructing a combination wheel and track-laying vehicle the general practice has been to retain the driving and running gear characteristics of the track-laying vehicle or to considerably modify the standard arrangement of these elements in a wheeled vehicle.

The combination wheel and track-laying vehicle has little or no application in the commercial field but is especially suited for military purposes. As a consequence any development of a vehicle of this type does not have the advantages and benefits resulting from the extended operation and the intense development of the commercial wheeled vehicle.

With a view to creating a potential reserve of military vehicles from the commercial type vehicle and making available existing manufacturing establishments to insure immediate production in time of emergency, it is proposed in the present invention to utilize the standard commercial chassis and with only a slight modification adapt it for both wheel and belt traction.

One essential feature of a track-laying vehicle, especially where the track is of the belt type, is a provision for maintaining the track under a predetermined tension. In the present invention the application of this provision is made on a Model 1935 Ford chassis by substituting long shackle bolts and arranging the radius rod yoke so that it can be moved from the driver's seat to longitudinally displace the front axle unit.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a plan view with parts broken away of a portion of a standard chassis modified in accordance with the invention.

Figs. 2, 3 and 4 are sectional views on the corresponding lines of Fig. 1.

Fig. 5 is a view in front elevation of the spring shackle with the front shackle removed and the bolts in section.

Referring to the drawing by characters of reference:

The vehicle comprises a commercial automobile chassis including a frame 5, front axle 6, front steering wheel 7 and a transversely disposed semi-elliptic leaf spring 8 clipped to the frame and having each of its ends associated through a shackle 9 with a projecting arm 10 fixed to the axle by a bolt 11. The shackle bolts 12 and 13 respectively engaging the spring bearing 14 and arm bearing 15 are considerably longer than the bearings.

The radius rod yoke 16 of the standard vehicle is connected to the opposite ends of the axle, but its rear end 17, instead of being connected to an element of the frame is slidably mounted in hangers 18—18 secured to the frame. A horizontally disposed lever 19 mounted on the frame by means of a pivot pin 20 has one end engaging the end 17 of the yoke, conveniently by a bolt 21, and the other end secured by a pin 22 to the lower end of an upright lever 23 extending through the floor 24 into the operator's compartment. The lever 23 is mounted on a pivot pin 25 and is held in position of adjustment by a latch 26 adapted to engage a recessed arc 27.

An endless band track 28 trained about the wheels on each side of the vehicle is shown in Fig. 1 and is adapted to be frictionally driven. The tension on the tracks is varied when the axle is displaced longitudinally of the vehicle as is clearly apparent from Fig. 2, and this operation may be performed when the vehicle is stationary or in movement. If the yoke 16 is moved forwardly the arm bearing 15 slides on the shackle bolt 13 and if the yoke is moved rearwardly the shackle is carried along, the bolt 12 sliding through the spring bearing 14. While a total movement of the axle of about two and one-half inches has been found sufficient the drawing illustrates a provision for a greater movement for the purpose of clarity.

When the vehicle is being operated with the tracks in place, the front steering wheels are locked against turning in any convenient manner and steering is accomplished by a divided brake system as heretofore proposed in the art.

I claim:

1. A combination wheel and track-laying vehicle including a wheeled axle unit, a pair of projecting arms on the axle unit and each having a bearing, a shackle for each arm including a pair of bolts one of which is slidably mounted in the bearing of the arm and is longer than said bearing, a transversely disposed spring having a bearing at each end for slidably receiving the other bolt of the corresponding shackle, said other bolts being longer than the bearings of the spring, a frame secured to and supported by the spring, a radius rod yoke connected to the axle unit and slidably mounted on the frame, and a lever for displacing the yoke longitudinally of the vehicle.

2. A combination wheel and track-laying vehicle including a wheeled axle unit, a pair of projecting arms on the axle unit and each having a bearing, a shackle for each arm including a pair of bolts one of which is slidably mounted in the bearing of the arm and is longer than said bearing, a transversely disposed spring having a bearing at each end for slidably receiving the other bolt of the corresponding shackle, said other bolts being longer than the bearings of the spring, a frame secured to and supported by the spring, and means for moving the axle unit longitudinally of the vehicle and relative to the spring.

3. A combination wheel and track-laying vehicle including a wheeled axle unit, a spring shackle carried adjacent each end of the axle unit and including a pair of bolts one of which has a sliding mounting in the axle unit, a transversely disposed spring having a bearing at each end for slidably receiving the other bolt of the corresponding shackle, said other bolts being longer than the bearings of the spring, a frame secured to and supported by the spring, and means for moving the axle unit longitudinally of the vehicle and relative to the spring.

4. A combination wheel and track-laying vehicle including a wheeled axle unit having a bearing adjacent each end, a transversely disposed spring in a generally parallel plane with the axle unit and having a bearing at each end, spring shackles connecting the axle unit and spring and including bolts that are longer than the bearings of said members whereby the bolts and bearings have relative movement longitudinally of the vehicle, a frame secured to and supported by the spring, and means for moving the axle unit longitudinally of the vehicle and relative to the spring.

5. A combination wheel and track-laying vehicle including a wheeled axle unit, a spring disposed transversely of the axle unit, slidable connections between the axle unit and the ends of the spring whereby the axle unit is movable longitudinally of the vehicle and relative to the spring, and means for moving the axle unit.

JAMES A. DORST.